G. W. BYRD.
PEANUT HARVESTER.
APPLICATION FILED MAY 3, 1919.
1,345,315.
Patented June 29, 1920.
2 SHEETS—SHEET 2.
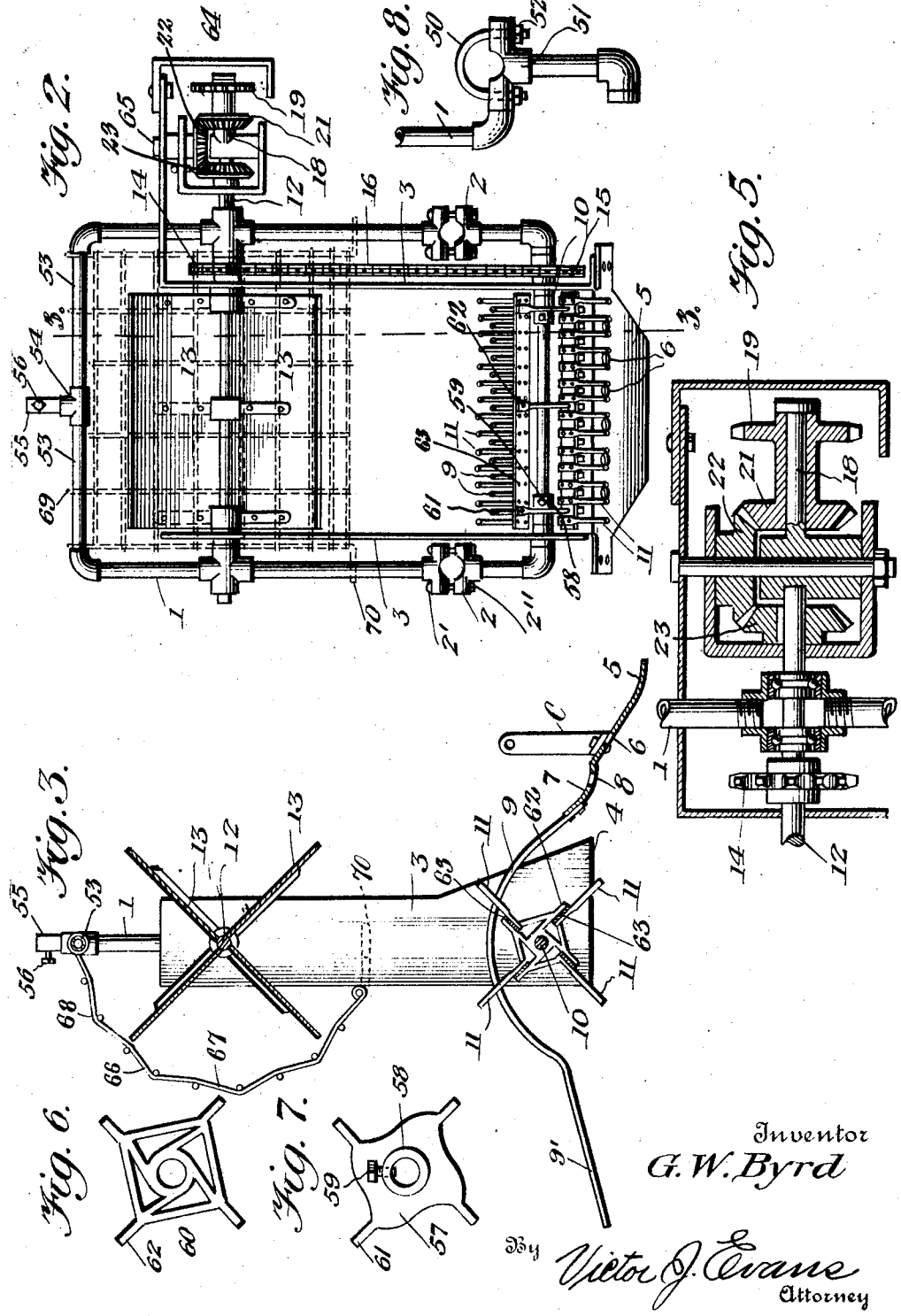
Inventor
G. W. Byrd
By Victor J. Evans
Attorney

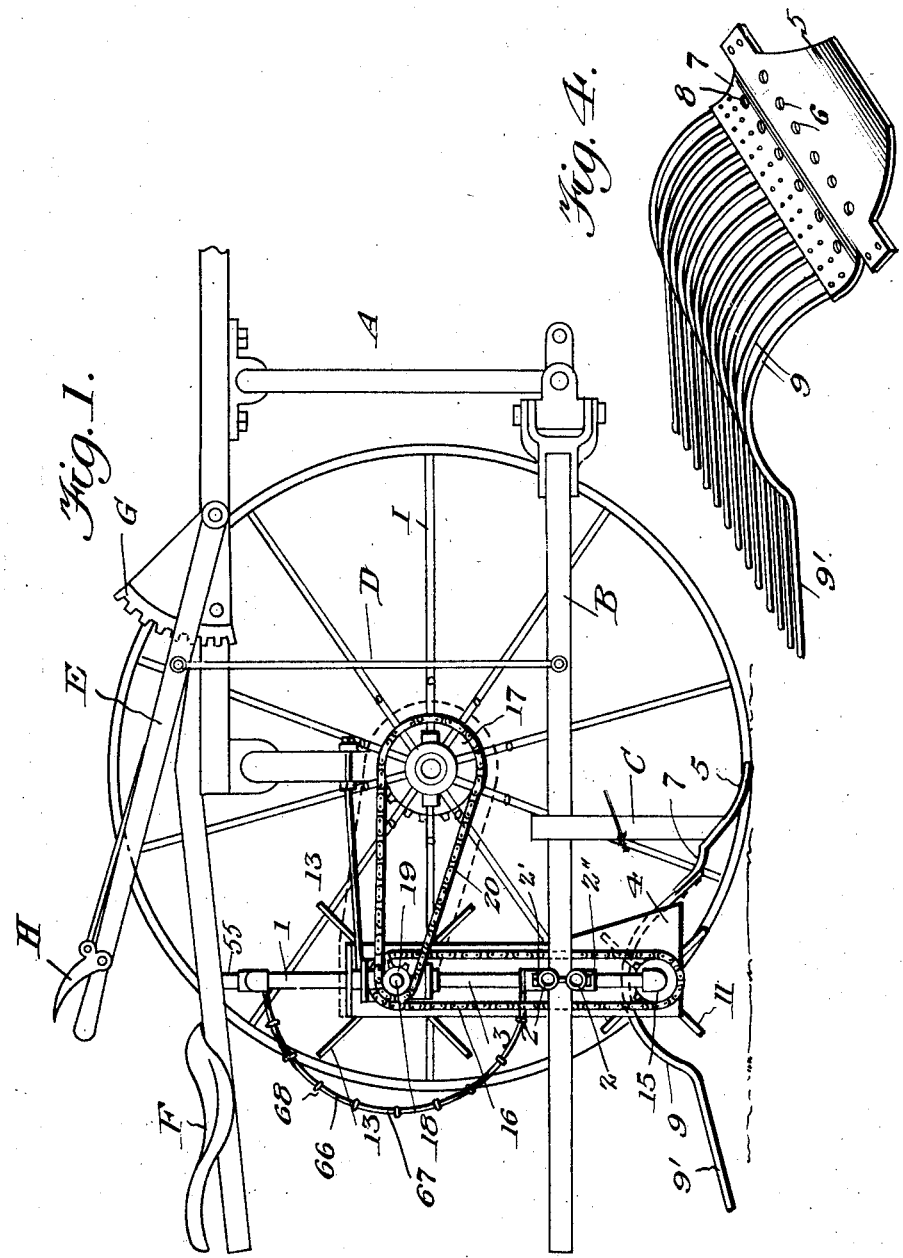

UNITED STATES PATENT OFFICE.

GORDON W. BYRD, OF DALLAS, TEXAS.

PEANUT-HARVESTER.

1,345,315.  Specification of Letters Patent.  Patented June 29, 1920.

Application filed May 3, 1919. Serial No. 294,544.

*To all whom it may concern:*

Be it known that I, GORDON W. BYRD, a citizen of the United States, residing at Dallas, in the county of Dallas and State of Texas, have invented new and useful Improvements in Peanut-Harvesters, of which the following is a specification.

This invention has reference to a harvester attachment for cultivator frames.

An object of the invention is to produce a device of this character which may be easily, quickly and securely attached to a cultivator frame of any ordinary character and which is designed for harvesting peanuts in an efficient and expeditious manner.

A further object of the invention is to produce a peanut harvester including a share connected to the ends of centrally arched tines, the said share designed to enter the earth to uproot and sever the peanut vines, fenders being arranged to the opposite sides of the arched center of the tines, a shaft being journaled on the fender beneath the said center of the tines and said shaft having arranged thereon spaced teeth designed to pass through the spaces between the tines, means being provided for operating the shaft in one direction, while arranged above the shaft is a fan operated by the propelling means for the device, the said fan being received in a reticulated protector designed to assist in depositing the vines upon the surface of the soil as well as aerating the vines.

Many other objects and advantages will present themselves as the nature of the invention is better understood, reference being had to the accompanying drawings in which there is illustrated a simple and satisfactory embodiment of the invention reduced to practice, and in the said drawings:

Figure 1 is a side elevation of the improvement attached to an ordinary construction of cultivator frame, the nearest wheel being removed.

Fig. 2 is a rear elevation of the improvement detached.

Fig. 3 is a sectional view approximately on the line 3—3 of Fig. 2.

Fig. 4 is a perspective view of the combined directing tines and share.

Fig. 5 is an enlarged detail sectional view through the shaft carrying the sprocket wheels of the beater and fan shafts.

Fig. 6 is a view of the central hub member for the beater.

Fig. 7 is a view of one of the outer hub members of the beater.

Fig. 8 is a detail elevation illustrating a modified means of attaching the improvement to the cultivator frame.

My improvement is designed to be attached to any ordinary construction of cultivator frames, either riding or walking without requiring any alteration in the construction of such frames. However, all of the beams are removed except the outer and lower beams, and on these beams the front feet remain.

A cultivator frame is illustrated in Fig. 1 of the drawings and is broadly indicated by the character A. The lower beam is indicated by the numeral B and the foot member by the character C. Both of the beams B, although only one is shown in the drawings, are connected by links D to the pivoted lever E which has its handle portion disposed in close proximity to the driver's seat F. The lever E is provided with a spring influenced pawl H that engages with the toothed segment G and the said pawl is pivotally connected to the lever E. The beams B, being pivotally connected to the rear of the cultivator frame, in the usual manner may be thus raised or lowered, and consequently the combined share and tine member of the improvement may be brought in proper relation to the vines to be operated on. In this connection I desire to state that while my improvement is primarily devised for harvesting peanut vines and nuts, the same is not to be thus restricted in its useful application, as it will be obvious that my improvement may be successfully employed as a potato harvester and in various other connections, as will be apparent as the details of the construction are entered into.

The improvement contemplates the employment of a substantially rectangular frame 1 which is preferably made up of pipe sections connected by suitable couplings, and the side members of the said frame, adjacent the lower ends thereof have their pipe members connected by T-couplings 2 which have their confronting faces provided with semi-cylindrical depressions to receive therebetween the beams B. The pairs of couplings 2 are connected together by adjustable means, such as bolts 2′, disposed at the opposite sides of the center thereof. These bolts are engaged by nuts 2″ whereby the coupling members 2 may be brought into proper frictional engagement with the beams B. The frame may be connected to the beams by a substantially U-shaped yoke 50 that passes through the lateral extensions of a T-coupler 51, similar to one of the couplers 2. The arms of the yoke 50 are threaded and are engaged by nuts 52 which contact with the under face of the lateral extensions of the coupler 51, such construction being illustrated in Fig. 8 of the drawings.

The upper member of the frame 1 comprises two pipe sections 53—53 which have their confronting ends connected by a T-coupling 54, the straight branch of the said coupling being directed upwardly, and in this branch is screwed or otherwise secured a vertically extending socket 55 provided with a threaded opening receiving therein a binding nut 56 whereby the staff of an umbrella may be received in the socket and secured thereto, the umbrella being designed to protect the driver on the seat from the rays of the sun and from inclement weather.

Inward of, but adjacent to the sides of the frame 1 are vertically arranged fenders 3, the lower ends of which, at the forward portions thereof being widened and pointed as at 4.

With the improvement I employ a combined share and director. The share portion of the device is indicated by the numeral 5 and is connected to the cultivator frame by being bolted or otherwise secured to the foot members C. The share 5 is arranged between the lower portions 4 of the fenders 3 and the said fender is adapted to penetrate beneath the surface of the soil when the harvester is in use. The fender may be raised or lowered by operating the lever E, as will be apparent. The share is provided, at its rear portion with a series of openings 6 through which dirt and sand may sift or fall. The share, at the rear edge thereof is formed with an upwardly and rearwardly disposed portion 7 that is likewise provided with openings 8, through which the dirt and sand may fall. The portion 7 carries at its rear part the tines that provide the directing means for the device. The tines, at the portions thereof connected to the share are rounded upwardly upon themselves as indicated by the numerals 9, and are from thence extended rearwardly at a downward inclination as indicated by the numerals 9'.

A shaft 10 is journaled for rotation at the lower portion of the frame 1 and passes transversely beneath the bowed or rounded portions 9 of the tines of the directing member. On the shaft, adjacent to the ends thereof are arranged hub members 57, having integral sleeves 58 that receive the shaft 10, binding elements 59 passing through the said sleeve and contacting with the said shaft for securing the hubs to the shaft. On the shaft 10, intermediate of the hubs 57 is a central hub 60. This hub is not fixed to the shaft, but is provided with a central opening which receives the shaft, and the hub 60 may be in the nature of a skeleton frame as illustrated in detail in Fig. 6. The hubs 57 and 60 are provided with radially disposed equally spaced arms 61 and 62 respectively, and connecting these arms are bars 63 on which spaced series of teeth 11 are secured. The teeth 11 are adapted to move through the spaces between the tines as the shaft 10 rotates. Means, hereinafter described, are provided for rotating the shaft 10. As the shaft 10 rotates it encounters the peanuts and vines and moves the same upwardly and rearwardly along the tines of the directing member. Thus the vines are lifted and the sand and soil are sifted from the same and permitted to fall to the ground through the spaces between the tines. The vines and nuts are ejected at the downwardly inclined ends 9' of the tines and are permitted to fall upon the surface of the soil where they may remain until they have been cured by the action of the sun and air and then gathered in the usual manner.

A shaft 12 is journaled for rotation at the upper portion of the frame and carries a series of fan blades 13. A sprocket wheel 14 is mounted upon the shaft 12 and a sprocket wheel 15 is mounted on the shaft 10. A sprocket chain 16 is trained around the wheels 14 and 15 and is adapted to transmit rotary movement from the shaft 12 to the shaft 10.

On the inner side, at the center of one of the ground wheels 5 is a sprocket wheel 17. This sprocket wheel is preferably connected to the ground wheel by being clamped to the spokes of the said ground wheel. In longitudinal alinement with the end of the shaft 12 which extends outwardly of the frame through one of the bearings on the side of the said frame is a stub shaft 18 journaled in a suitable bearing provided in an auxiliary frame 64 supported at one side of the main frame on the said main frame and on one of the fenders 3. On this stub shaft 18 is a sprocket wheel 19, and trained around the sprocket wheels 19 and 17 is a sprocket chain 20 which transmits movement from the wheel I of the cultivator to the stub shaft. On the stub shaft is secured a beveled toothed gear 21 that meshes with a beveled pinion idler 22 journaled on a vertically disposed shaft 65 in the auxiliary frame 64. On the outer end of the shaft 12 is a beveled pinion 23 that also meshes with the idler 22. By this arrangement it will be seen that by reason of the relative sizes of the beveled intermeshing pinions the shaft 12 may be rotated at a relatively fast rate of speed, and also the arrangement permits of the shaft 12 being revolved in an opposite direction from that of the sprocket wheels 17 and 19, and consequently permits of the beater provided by the radially disposed teeth 11 being turned in an opposite direction to that of the ground wheels I of the cultivator.

As the shaft 12 rotates the fan blades 13 are carried around the axis thereof and the said blades will discharge a blast of air downwardly and rearwardly. This blast of air will move toward the operator of the harvester and serve to keep him comfortable during hot weather. It will also move toward the vines which are being forced or ejected over the tines, and consequently the vines and peanuts will be subjected to a blast of air at or previous to the time that they are deposited upon the surface of the soil and this will accomplish sufficient aeration of the vines and peanuts and prevent them from mildewing when they rest upon the surface of the soil. After the peanuts and vines have been permitted to rest upon the soil for a sufficient length of time to effect the curing thereof by action of the air and the sun the vines and peanuts may be gathered and shocked in the usual manner. To protect the operator from injury by contact with the blades of the revolving fan, also to provide a means for preventing the driving reins being caught by the fan and to prevent other objects which might inflict injury to the fan contacting therewith, I have provided a curved fender 66. This fender is preferably constructed of strands of wire, and the curved strands 67 thereof are connected by straight transverse strands 68. The two end curved strands, at each side of the fender have their upper portions rounded upon themselves to provide eyes 69 that are arranged around the upper pipe sections 53 of the frame 1. The outer end members of the fender have their lower ends extended laterally and rounded upon themselves to provide eyes 70 which are received around the vertical pipe members that constitute the sides of the frame 1.

My improvement may be easily attached to any ordinary construction of cultivator frames. By its use peanuts and vines and other vegetables may be harvested in an easy and expeditious manner. The construction is simple, and the beater member acting between the tines of the directing member not only serves to direct the vines rearwardly of the machine but separates the soil and sand from the vines and nuts, leaving the vines in proper condition on the surface of the soil to permit of the proper curing of the same preparatory to a subsequent shocking and threshing. When the improvement is not employed in harvesting peanuts and root crops that grow under the soil the beater and upright chain should be removed. When not in use at harvest time, remove short couplings under each cultivator beam and take beater and share and tines off and put away till next harvest time. Then by screwing on two lengths of pipe 12 inches long the suction or air fan may be raised above the cultivator seat to fan the driver on cultivator, same as an electric fan while plowing the other field crops, and the farmer will also be in the shade and not be exposed to the hot rays of the sun, and I claim this to be of great benefit to the farmer and also to encourage the hired man to work for the farmer who has this machine.

All of the revoluble parts of the improvement are journaled on anti-frictional bearings to insure the free working thereof.

Having thus described the invention, what is claimed as new, is:—

1. A peanut harvester comprising a frame, fenders carried at the sides of the frame, a share carried by the fender, upwardly and rearwardly curved tines attached to the share, a shaft journaled for rotation below the tines and having teeth adapted to move through the spaces between the tines and means for discharging a blast of air across the upper ends of the tines.

2. A peanut harvester comprising a frame, a share connected with the frame and provided with perforations, tines attached to the share, a shaft journaled for rotation below the tines and provided with teeth adapted to move through the spaces between the tines, and a fan located above the tines and adapted to discharge a blast of air across the delivery ends of the same.

3. A peanut harvester comprising a frame, a share connected with the frame and having at its rear edge an upwardly and rearwardly curved portion, spaced tines attached to the said upwardly and rearwardly curved portion of the share, a shaft journaled for rotation below the tines, teeth carried by the shaft and adapted to move through the spaces between the tines, and means for discharging a blast of air across the delivery ends of the tines.

4. A peanut harvester comprising a frame, a share attached to the frame, spaced tines connected with the share, a shaft journaled for rotation below the tines, teeth carried by the shaft and adapted to move through the spaces between the tines, a second shaft journaled upon the frame above the first mentioned shaft, fan blades carried by the second mentioned shaft, means for rotating the second mentioned shaft, means for rotating the first mentioned shaft from the second mentioned shaft, and a fender for the fan.

In testimony whereof I affix my signature.

GORDON W. BYRD.